US010095198B1

(12) United States Patent
Ross et al.

(10) Patent No.: US 10,095,198 B1
(45) Date of Patent: Oct. 9, 2018

(54) CLOSED-LOOP CONTROL SYSTEM USING UNSCENTED OPTIMIZATION

(71) Applicant: The United States of America, as represented by the Secretary of the Navy, Washington, DC (US)

(72) Inventors: Isaac Michael Ross, Monterey, CA (US); Mark Karpenko, Salinas, CA (US); Ronald J. Proulx, Waban, MA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/643,135

(22) Filed: Jul. 6, 2017

Related U.S. Application Data

(63) Continuation-in-part of application No. 15/208,784, filed on Jul. 13, 2016, and a continuation-in-part of
(Continued)

(51) Int. Cl.
*G05B 13/04* (2006.01)

(52) U.S. Cl.
CPC ........... *G05B 13/045* (2013.01); *G05B 13/04* (2013.01); *G05B 13/042* (2013.01); *G05B 13/048* (2013.01)

(58) Field of Classification Search
CPC .... G05B 13/045; G05B 13/04; G05B 13/042; G05B 13/048
See application file for complete search history.

(56) References Cited

U.S. PATENT DOCUMENTS

| 5,550,953 A * | 8/1996 | Seraji | B25J 9/162 700/262 |
| 2009/0077419 A1* | 3/2009 | Di Palma | G06F 11/3452 714/21 |
| 2009/0254198 A1* | 10/2009 | Lu | G05B 13/04 700/7 |

OTHER PUBLICATIONS

Julier et al, "Unscented Filtering and Nonlinear Estimation," Proceedings of the IEEE 92(3) (2004).
(Continued)

*Primary Examiner* — Kenneth M Lo
*Assistant Examiner* — David J Wynne
(74) *Attorney, Agent, or Firm* — Naval Postgraduate School; James B. Potts; Lisa A. Norris

(57) ABSTRACT

The disclosure provides a closed-loop controller for a controlled system comprising a comparison element generating an error e, a compensator generating a control $u_N$ value based on the error e, and a control allocator determining a manipulated parameter $u_M$ value based on the control $u_N$. The control allocator typically utilizes a control effectiveness function and determines $u_M$ value by selecting one or more specific system $x_0$ signals from the system state $x_i$ or system input $y_j$ values or system parameters values $p_k$ reported, defining a plurality of distributed $x_D$ around each specific system $x_0$ signal, and minimizing an error function $E(z_i)$, where the error function $E(z_i)$ is based on errors which arise from use of the plurality of distributed $x_D$ in the control effectiveness function rather than one or more specific system $x_0$ signals.

20 Claims, 8 Drawing Sheets

Related U.S. Application Data application No. 14/699,051, filed on Apr. 29, 2015, now Pat. No. 9,727,034.

(60) Provisional application No. 62/191,568, filed on Jul. 13, 2015, provisional application No. 61/985,917, filed on Apr. 29, 2014.

(56) References Cited

OTHER PUBLICATIONS

Julier, "The spherical simplex unscented transformation," American Control Conference, 2003. Proceedings of the 2003 (3) (2003).
Julier et al., "A new approach for filtering nonlinear systems," American Control Conference, Proceedings of the 1995 (3) (1995).
Turner et al., "Model based learning of sigma points in unscented Kalman filtering," 2010 IEEE International Workshop on Machine Learning for Signal Processing (2010).
Wan et al., Kalman Filtering and Neural Networks (ed S. Haykin), pp. 221-279, (2001).
Julier et al., "A New Extension of the Kalman Filter to Nonlinear Systems," Proceedings of AeroSense: The 11th International Symposium on Aerospace/Defense Sensing, Simulation and Controls, Orlando, FL, SPIE 1997.
Julier et al., "A consistent, debiased method for converting between polar and Cartesian coordinate systems," Proceedings of SPIE—The International Society for Optical Engineering (1997).
Ross et al., "Unscented Optimal Control for Space Flight," Proceedings of the 24th International Symposium on Space Flight Dynamics (ISSFD) (2013).
King et al., "A simple approach for predicting time-optimal slew capability," Acta Astronautica 120 (2016).
Shaffer et al., "Unscented Guidance for Waypoint Navigation of a Fixed-Wing UAV," 2016 American Control Conference (ACC), Boston Marriott Copley Place, Jul. 6-8, 2016. Boston, MA, USA.
Ross et al., "Unscented Guidance," 2015 American Control Conference, Jul. 1-3, Chicago, IL. Paper FrC06.4 (2015).

* cited by examiner

CLOSED-LOOP CONTROL SYSTEM USING UNSCENTED OPTIMIZATION

RELATION TO OTHER APPLICATIONS

This patent application claims priority from provisional patent application 62/191,568 filed Jul. 13, 2015, nonprovisional patent application 15/208,784 filed Jul. 13, 2016, and nonprovisional patent application 14/699,051 filed Apr. 29, 2015, which are hereby incorporated by reference in their entirety.

FIELD OF THE INVENTION

One or more embodiments relates to a closed-loop control system for control of a closed system utilizing a control effectiveness function $u_N = W(x_i, y_j, p_k)u_M$, where $u_M$ is a vector of manipulated variables determined through minimization of an error function $E(z_i)$, and where the individual errors comprising $E(z_i)$ arise through evaluation of the control effectiveness function utilizing distributed variables in a $(\mu, \sigma^2)$ distribution around system state $x_i$, system output $y_i$ values, and/or control effectiveness parameters $p_k$.

BACKGROUND

Modern controllers generally sense the operation of a system, compare that against a desired behavior, compute corrective actions based on a model of the system's response to external inputs, and actuate the system to effect the desired change. Generally, the key issues in designing control logic are ensuring that the dynamics of the closed loop system are stable and have the desired behaviors, such as good disturbance rejection, fast responsiveness, and others. These properties are established using a variety of modeling and analysis techniques that capture the essential physics of the system and permit the exploration of possible behaviors in the presence of uncertainty, noise and component failures. However, measurement noise and other uncertainties may corrupt the information about the process variables that sensors deliver. Additionally, the dynamics of the closed loop system as expressed in control allocation or other control mapping functions may lead to extreme sensitivities at certain operating points, making a process difficult to control.

Often the impacts of uncertainties or excessive sensitivity are dealt with by designing inviolable thresholds well within a given system's available operating envelope when necessary, or simply living with the impact of the uncertainties when such reliance can be safely afforded. These standard approaches act to reduces the size of operational envelopes and degrade performance, and often require oversized systems since only a fraction of the system's true capability is utilized during operation. Alternatively, in some cases and when such reliance may be safely afforded, the impact of uncertainties on the performance of a system may be simply accepted as part of the overall process, and the uncertainty is treated as a limitation on the ultimate fidelity of the system.

It would be advantageous to provide a closed-loop control system allowing alternative and more beneficial treatment of various high sensitivity operating points and measurement uncertainties. Such a control system would allow for expanded operation within inherent operating envelopes and improve the overall performance of various systems. Correspondingly, disclosed herein is a closed-loop controller for a controlled system which improves system performance by treating identified system state input parameters and system output parameters as a collection of possibly uncertain points identified by utilizing a statistical distribution parameterized by a mean and a variance and/or covariance denoted herein as a $(\mu, \sigma^2)$ distribution around the identified parameter. The controlled system is described by a control effectiveness function relating a desired system response to the system state input and system output parameters, and a control allocator within the closed-loop controller utilizes the control effectiveness function to minimize an error function, where the errors arise through use of the use of the $(\mu, \sigma^2)$ distributed points within the control effectiveness function. The closed-loop controller may be utilized by any controlled system having a control effectiveness function in order to increase available performance.

These and other objects, aspects, and advantages of the present disclosure will become better understood with reference to the accompanying description and claims.

SUMMARY

The disclosure provides a closed-loop controller for a controlled system comprising a comparison element, a compensator, and a control allocator. The comparison element receives an input r signal and an input y signal and generates an error e value typically proportion to the difference. The compensator receives the error e value and generates a control $u_N$ value based on a controlling equation G(e). The control allocator receives the control $u_N$ value and is configured to relate the control $u_N$ value to the controlled system through a control effectiveness function typically having a form such as $u_N = W(x_i, y_j, p_k)u_M$, where $W(x_i, y_j, p_k)$ comprises one or more terms representing system state $x_i$ values and system output $y_j$ values reported from the controlled system, $u_M$ is a vector of manipulated parameters to be applied to the controlled system, $p_k$ is one or more control effectiveness parameters, and W serves to map $u_M$ to $u_N$.

The control allocator selects one or more specific system $x_O$ values from among the system state $x_i$ reported, the system output $y_j$ reported, the control effectiveness parameters $p_k$ received, or combinations thereof, and defines a plurality of distributed $x_D$ around each specific system $x_O$ signal by constructing a probability density function $(\mu, \sigma^2)$ around the specific system $x_O$ signal(s). The values for the manipulated variable $u_M$ vector are based on a minimization of an error function $E(z_i)$, where the error function $E(z_i)$ is based on errors which arise from use of the plurality of distributed $x_D$ in the control effectiveness function rather than one or more specific system $x_O$ signals. In a particular embodiment, the error function $E(z_i)$ is a residual sum of squares. The result of the minimization provides the manipulated parameter $u_M$ value. The control allocator provides the manipulated parameter $u_M$ value or signal to a control effector or control effectors within the controlled system, so that the control effector(s) may adjust within the controlled system and provoke a response in the controlled system similar to the control $u_N$ signal commanded via a controlling equation G(e), in order to mitigate the error e value.

The novel apparatus and method are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a closed-loop control system providing a vector of manipulated variables through evaluation of a control effectiveness function using distributed variables in a ($\mu,\sigma^2$) distribution around system state $x_i$ and/or system output $y_j$ values and/or control effectiveness parameters $p_k$.

Figure 1:
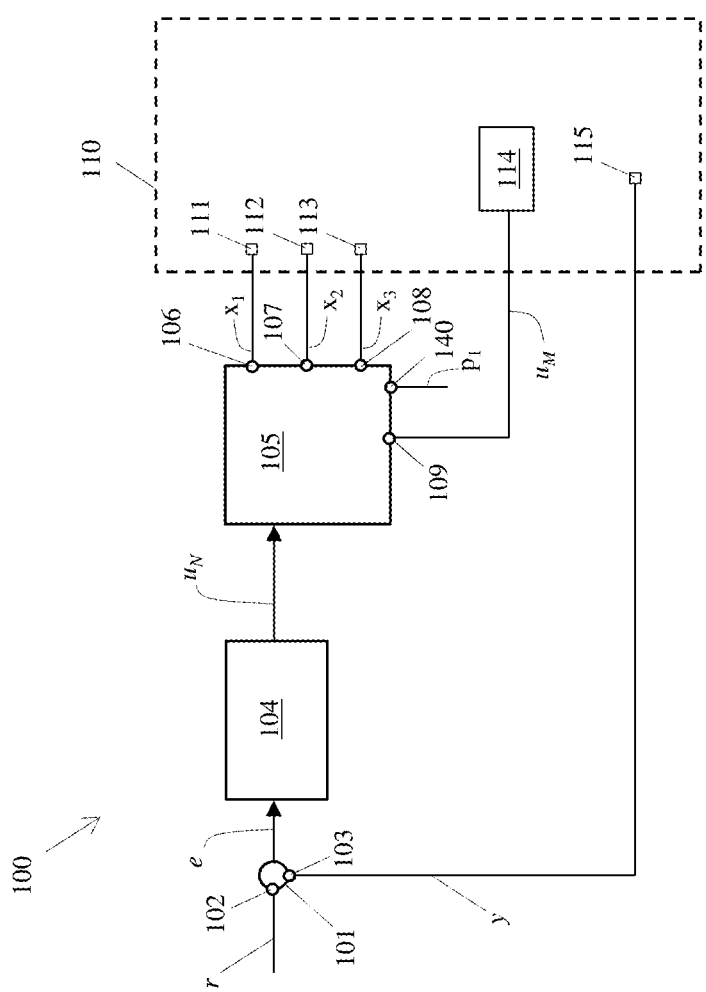
FIG. 1 illustrates an embodiment of the closed-loop control system.

In brief and with reference to FIG. 1, the disclosure provides a closed-loop controller 100 comprising a comparison element 101, a compensator 104, and a control allocator 105. Closed-loop controller 100 generally operates in communication with a controlled system 110, where system sensors such as 111, 112, and 113 within controlled system 110 provide system state $x_i$ signals such as $x_1$, $x_2$, and $x_3$, and sensors such as output sensor 115 provide system output $y_j$ signals such as y. The comparison element 101 receives an input r signal at 102 and the controlled system output y at 103, and generates an error e value typically proportional to the difference. Closed-loop controller 100 may be a single-input-single-output (SISO) system or a multi-input multi-output (MIMO) system, as those terms are used in the art. The compensator 104 receives the error e value and generates a control vector $u_N$ value based on a controlling equation G(e) evaluated by compensator 104. One or more terms of the equation G(e) comprise the error e value such that the control $u_N$ value is dependent on the error e value. In a typical embodiment, compensator 104 is a proportional-integral-derivative controller (PID controller).

The control allocator 105 is in data communication with comparison element 101 and receives the control $u_N$ value. Control allocator 105 is typically a digital device and is programmed to relate the control $u_N$ value to the controlled system through a control effectiveness function typically having a form such as $u_N=W(x_i, y_j, p_k)u_M$. In the control effectiveness function, $W(x_i, y_j, p_k)$ is one or more terms comprising system state $x_i$ values such as $x_1$, $x_2$, and $x_3$ reported from the controlled system, system output $y_j$ values such as y reported from the controlled system, one or more control effectiveness parameters $p_k$ such as $p_1$ originating from inside or outside the controlled system, or combinations thereof. Additionally, $u_M$ is a vector of manipulated parameters to be applied to the controlled system. The vector of manipulated parameters $u_M$ is determined by control allocator 105 based on the provided system state $x_i$ values, the system output $y_j$ value, and/or control effectiveness parameters $p_k$, and typically dictates signals to be provided to one or more control effectors 114 within controlled system 110. Function W serves to map $u_N$ to $u_M$. In practice, the manipulated parameter $u_M$ signal causes the control effectors 114 in controlled system 110 to act in a manner to provoke controlled system 110 into a desired response, based on the error e provided by comparison element 101.

Analogous closed-loop controllers which receive system state $x_i$ values, system output $y_j$ values, and/or or control effectiveness parameters $p_k$, utilize a control effectiveness function to generate one or more manipulated parameters $u_M$ based on some combination of system state $x_i$, system output $y_j$, and/or control effectiveness parameter $p_k$ values, then provide signals based on the determined manipulated parameters $u_M$ back to the controlled system in order to provoke some desired response based on a perceived error are generally are well known in the art. See e.g. M. Gopal, *Control Systems: Principles and Design* ($2^{nd}$, 2002); see also *Process Control: Instrument Engineers' Handbook* (B. Liptak ed., 1995), among many others. However, as discussed, often these systems may be prone to generating large, undesirable values for the manipulated parameter $u_M$ value depending on the mathematics of the control effectiveness function, or the relatively direct treatment of the control effectiveness function in determining the manipulated parameter $u_M$ value requires oversized systems with large safety margins in order to combat the possible effects of a large combined uncertainty. See e.g. Ross et al., "Monte Rey Methods for Unscented Optimization," AIAA Guidance, Navigation, and Control Conference, AIAA SciTech, (AIAA 2016-0871) (2016); see also Ross et al., "Unscented Optimal Control for Space Flight," *Proceedings of the 24th International Symposium on Space Flight Dynamics (ISSFD)* (2014). In contrast, the closed-loop controller disclosed herein greatly mitigates these and other issues by generating values for the manipulated parameter $u_M$ vector by utilizing a plurality of distributed $x_D$ around one or more of the system state $x_i$ values, system output $y_j$ values, control effectiveness parameter $p_k$ values, or combinations thereof, where each $x_D$ is related to a selected system state $x_i$, system output $y_j$ value, or control effectiveness parameter $p_k$ value by a probability density function ($\mu,\sigma^2$).

The closed-loop controller disclosed here mitigates these issues and others through specific operations conducted by control allocator 105. Briefly and as will be discussed, control allocator 105 selects one or more specific system $x_0$ values from among system input values which comprise the system state $x_i$, system output $y_j$, and control effectiveness parameter $p_k$ values, defines a plurality of distributed $x_D$ around each specific system $x_0$ value by constructing a probability density function ($\mu,\sigma^2$) around each specific system $x_0$ value selected, then provides a manipulated variable $u_M$ value based on a minimization of an error function $E(z_i)$, where the error function $E(z_i)$ is based on errors which arise from use of the plurality of distributed $x_D$ in the control effectiveness function rather than one or more specific system $x_0$ values. The result of the minimization provides the manipulated parameter $u_M$ value. The control allocator translates the manipulated parameter $u_M$ value to a manipulated parameter $u_M$ signal and provides the manipulated parameter $u_M$ signal to one or more control effectors within the controlled system, so that the control effectors may adjust within the controlled system and drive the controlled system to respond in a manner similar to the control $u_N$ value, in order to mitigate the error e value.

Figure 2:
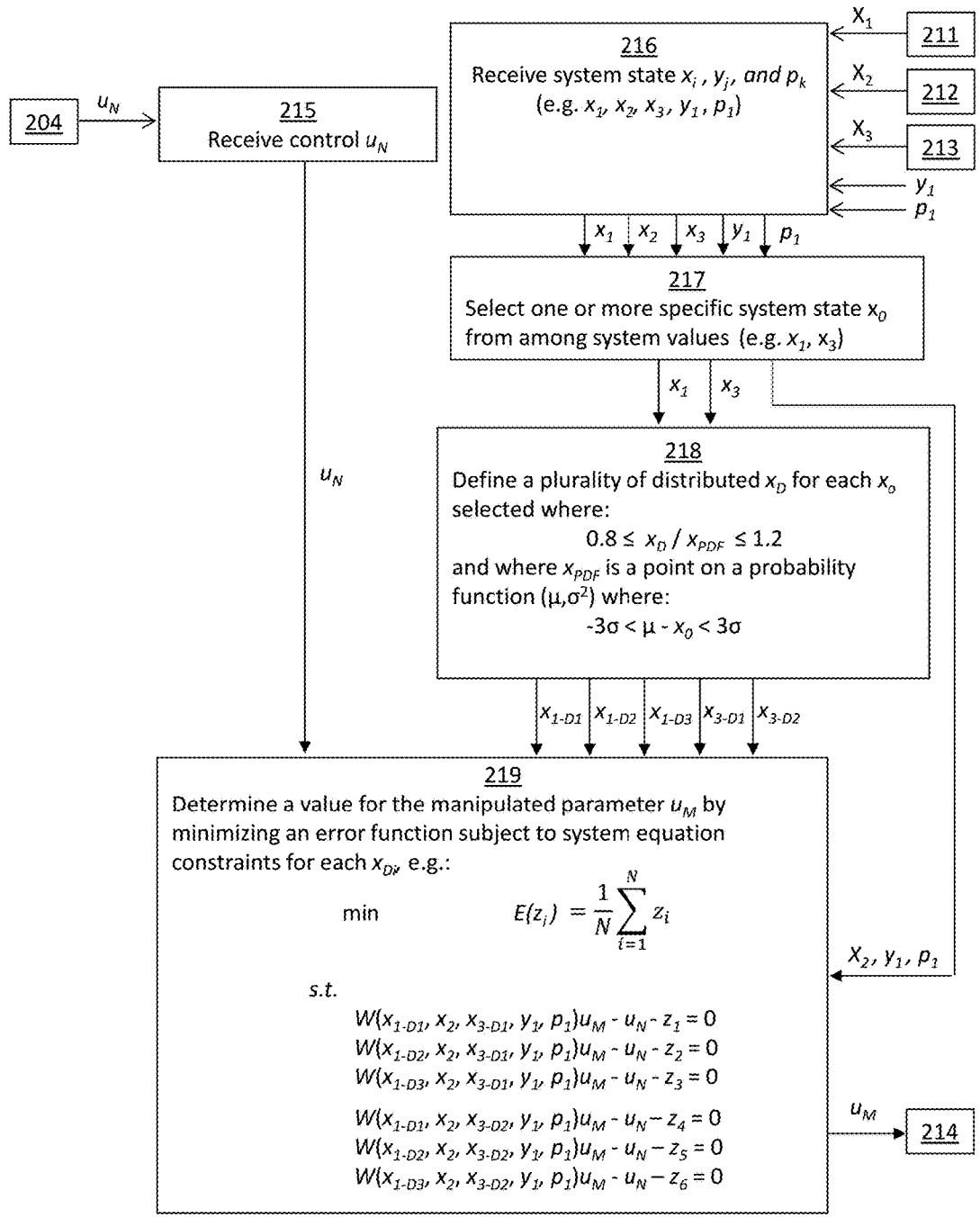
FIG. 2 illustrates an embodiment of the control allocator comprising the closed-loop control system.

The control allocator 105 disclosed determines manipulated parameter $u_M$ signals by performing steps similar to those illustrated at FIG. 2. At 215, the control allocator receives the control $u_N$ value from a compensator 204, and at 216, the control allocator receives system signals comprising system state $x_i$ signals $X_1$, $X_2$, and $X_3$ from sensors 211, 212, and 213 respectively, system output $y_j$ value illustrated as $y_1$, and a control effectiveness parameter $p_k$ value illustrated as $p_1$. The control allocator translates the system signals to system values suitable for digital processing, if required. For example, at 216, the control allocator translates the system state $x_i$ signals $X_1$, $X_2$, and $X_3$ to system state $x_i$ values $x_1$, $x_2$, and $x_3$.

At 217, the control allocator designates one or more specific system $x_0$ values, where each of the specific system $x_0$ values is one of the system values comprising system state $x_i$ values, system output $y_j$ values, and/or the control effectiveness parameter $p_k$ values. As an example, at FIG. 2 step 217, the control allocator selects the system state $x_i$ values illustrated as $x_1$ and $x_3$ to each serve as a specific system $x_0$ value. It is understood that the selection of $x_1$ and $x_3$ as illustrated is exemplary only, and at 217 the control allocator could have selected any of $x_1$, $x_2$, $x_3$, $y_1$, or $p_1$ to treat as a unitary specific system $x_0$ value, or could have selected any combination of $x_1$, $x_2$, $x_3$, $y_1$, and $p_1$ and treated each as a specific system $x_0$ value, in order to designate the one or more specific system $x_0$ values.

At 218, the control allocator defines a plurality of distributed $x_D$ around each specific system $x_0$ value, exemplified at FIG. 2 by $x_1$ and $x_3$. Each plurality of distributed $x_D$ represents an individual perturbation around the given specific system $x_0$ value which the plurality is intended to represent. The control allocator defines the plurality of distributed $x_D$ for a given specific system $x_0$ value by defining a probability density function $(\mu,\sigma^2)$ around the given specific system $x_0$ value and selecting each $x_D$ in the plurality of distributed $x_D$, based on a proximity to the defined probability density function $(\mu,\sigma^2)$ for the given specific system $x_0$ value. The probability density function $(\mu,\sigma^2)$ around the given specific system $x_0$ value has a mean $\mu$ such that $-3\sigma \leq x_0-\mu \leq 3\sigma$ where $x_0$ is the specific system $x_0$ value under consideration and further has a standard deviation $\sigma$. In certain embodiments, $-2\sigma \leq x_0-\mu \leq 2\sigma$ and in other embodiments $-\sigma \leq x_0-\mu \leq \sigma$. In further embodiments, $0.8 \leq \mu/x_0 \leq 1.2$. For each $x_D$ in the given plurality of distributed $x_D$ and as illustrated further below, the $x_D$ satisfies a relationship $0.8 \leq x_D/x_{PDF} \leq 1.2$, where $x_{PDF}$ is a point on the probability density function $(\mu,\sigma^2)$ centered around the given specific system $x_0$ value. Here, a probability density function $(\mu,\sigma^2)$ means a statistical distribution having a mean $\mu$ and a variance $\sigma^2$, such as a Normal, Beta, Uniform, Weibull, or other distributions known in the art. In an embodiment $0.9 \leq x_D/x_{PDF} \leq 1.1$, and in another embodiment $0.95 \leq x_D/x_{PDF} \leq 1.05$. In a further embodiment $0.9 \leq \mu/x_0 \leq 1.1$, and in an additional embodiment $0.95 \leq \mu/x_0 \leq 1.05$.

Figure 3:
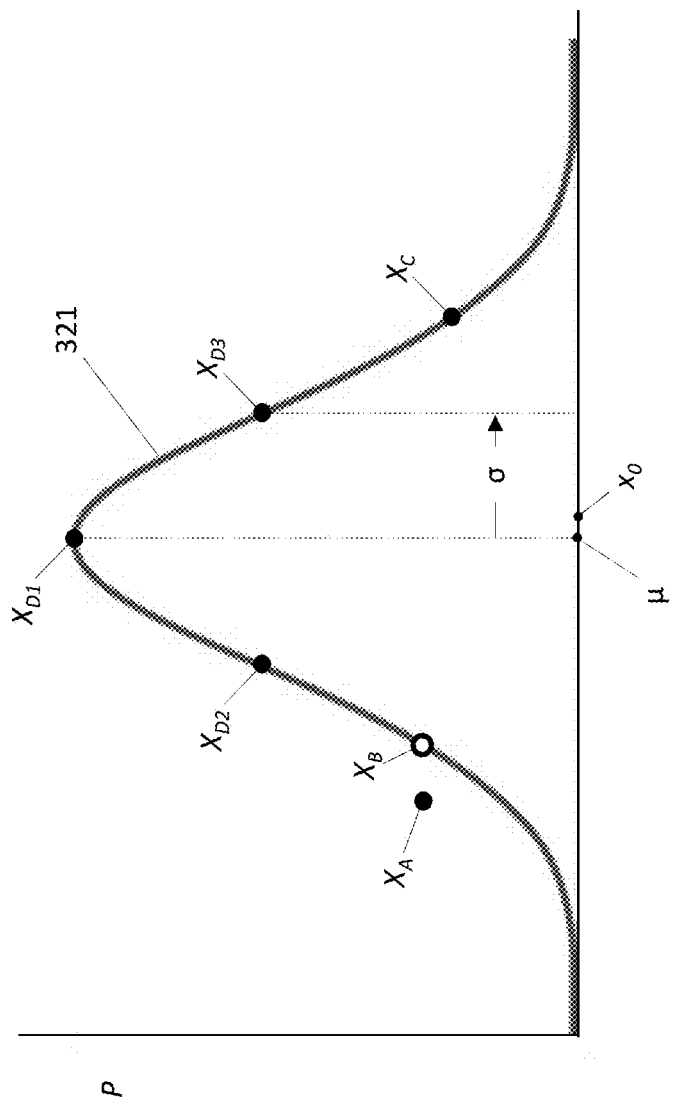
FIG. 3 illustrates a plurality of distributed points $x_D$.

As an example of a plurality of distributed $x_D$ representing a specific system $x_0$ value, FIG. 3 illustrates a probability density function $(\mu,\sigma^2)$ as graph 321. Graph 321 represents a perturbation around the specific system $x_0$ value illustrated as $x_o$ and has a mean $\mu$ and standard deviation $\sigma$ as illustrated, with in this case both $-3\sigma \leq x_0-\mu \leq 3\sigma$ and $0.8 \leq \mu/x_0 \leq 1.2$. The control allocator selects the plurality of distributed $x_D$ for the specific system $x_0$ value such that each $x_D$ satisfies the relationship $0.8 \leq x_D/x_{PDF} \leq 1.2$, where as stated earlier, $x_{PDF}$ is a point on the probability density function $(\mu,\sigma^2)$ illustrated as graph 321. For example, the control allocator might select the plurality of distributed $x_D$ to represent the specific system $x_0$ value as $x_{D1}$, $x_{D2}$, and $x_{D3}$, which as illustrated reside on graph 321 and thereby satisfy $0.8 \leq x_D/x_{PDF} \leq 1.2$. Alternatively, the control allocator might select the plurality of distributed $x_D$ to represent the specific system $x_0$ value as $x_A$, $x_{D2}$, and $x_{D3}$, where $0.8 \leq x_A/x_B \leq 1.2$ and where as illustrated $x_B$ is a point on a graph 321 representing the probability density function $(\mu,\sigma^2)$ of graph 321. The control allocator may select any $x_D$ for the plurality of $x_D$ to represent $x_0$ provided that $0.8 \leq x_D/x_{PDF} \leq 1.2$, where $x_{PDF}$ is a point on a probability density function $(\mu,\sigma^2)$ having a mean $\mu$ such that $-3\sigma \leq x_0-\mu \leq 3\sigma$. Additionally, the control allocator may select any quantity of points provided each point satisfies the above criterion. For example, the control allocator could select the plurality of distributed $x_D$ as $(x_A, x_C, x_{D1}, x_{D2}, x_{D3})$.

As discussed, the control allocator defines a plurality of distributed $x_D$ for each specific system $x_0$ value selected. Using $x_1$ and $x_3$ as before, the control allocator defines a first plurality of distributed $x_D$ corresponding to $x_1$ using a first probability density function $(\mu_1,\sigma_1^2)$ and defines a second plurality of distributed $x_D$ corresponding to $x_3$ using a second probability density function $(\mu_2,\sigma_2^2)$, where generally $\mu_1 \neq \mu_2$ and $\sigma_1 \neq \sigma_2$. At FIG. 2, the first plurality corresponding to $x_1$ is illustrated as $x_{1-D1}$, $x_{1-D2}$, $x_{1-D3}$, and the second plurality corresponding to $x_3$ is illustrated as $x_{3-D1}$, $x_{3-D2}$ respectively.

In some embodiments the $x_D$ are correlated such that the plurality of distributed $x_D$ is a vector and where the plurality of distributed $x_D$ is obtained using the multivariate probability density function $(\mu, \Sigma)$, and where the mean $\mu$ of the multivariate probability density function $(\mu, \Sigma)$ is a mean vector of a multivariate-probability density function $(\mu, \Sigma)$ and where $\Sigma$ is a covariance matrix of the multivariate probability density function $(\mu, \Sigma)$ and where $-3\sigma_i \leq x_{0,i}-\mu_i \leq +3\sigma_i$ where $x_{0,i}$ is a value along a given principal dimension of the probability distribution $(\mu, \Sigma)$ and where $x_0$ is the vector of the one or more specific system $x_{0,i}$ values that have been appropriately transformed from the principal axes back to the original coordinate axes of the multivariate-probability density function $(\mu, \Sigma)$. In one embodiment, principal directions can be obtained from principal component analysis in another embodiment principal directions can be determined by a singular value decomposition. In another embodiment, $-6\sigma_i \leq x_{0,i}-\mu_i \leq +6\sigma_i$, and in an additional embodiment $-N\sigma_i \leq x_{0,i}-\mu_i \leq +N\sigma_i$ where the value of N is determined from the chi-squared distribution associated with the dimension, d, of the multivariate probability density function $(\mu, \Sigma)$ for a given confidence interval CI %. In one embodiment, CI %=68.3%, and in another embodiment CI %=95.45%, and in another embodiment CI %=99.73%. As an example, for multivariate probability density function $(\mu, \Sigma)$ of d=4 dimensions, $N=\sqrt{16.25}$ for CI %=99.73 and $N=\sqrt{9.72}$ for CI %=95.45%.

At 219 of FIG. 2, and having defined the plurality of distributed $x_D$ for each of $x_1$ and $x_3$ at 218, the control allocator determines a manipulated parameter $u_M$ value by minimizing an error function $E(z_n)$, where the errors $z_i$ comprising the error function $E(z_n)$ arise through use of the various distributed $x_D$ when substituted for the specific system $x_0$ values in the control effectiveness function, such as the control effectiveness function $u_N=W(x_i, y_j, p_k)u_M$ exemplified at FIG. 2. The error function $E(z_n)$ as discussed comprises errors $z_n$, and is minimized subject to a series of constraints $W(x_{1-Di}, x_2, x_{3-Dj}, y_1, p_1)u_M-u_N=z_n$ or stated equivalently $W(x_{1-Di}, x_2, x_{3-Dj}, y_1)u_M-u_N-z_n=0$ which arise from the use of $x_{1-D1}$, $x_{1-2D}$, and $x_{1-3D}$ as $x_1$ in combination with the use of $x_{3-D1}$ and $x_{3-2D}$ as $x_3$ in the system equation. In conjunction at FIG. 2, the control allocator uses the control $u_N$ value indicated as $u_N$, the remaining system state $x_i$ value indicated as $x_2$, the system output $y_j$ value indicated as $y_1$, and the control effectiveness parameter $p_k$ value indicated as $p_1$, and in the exemplary operation of FIG. 2 and at 220 the control allocator performs an exemplary operation according to:

$$\min \ E(z_i) = \frac{1}{N}\sum_{i=1}^{N} z_i$$

$$\text{s.t. } W(x_{1-D1}, x_2, x_{3-D1}, y_1, p_1)u_M - u_N - z_1 = 0$$

$$W(x_{1-D2}, x_2, x_{3-D1}, y_1, p_1)u_M - u_N - z_2 = 0$$

$$W(x_{1-D3}, x_2, x_{3-D1}, y_1, p_1)u_M - u_N - z_3 = 0$$

$$W(x_{1-D1}, x_2, x_{3-D2}, y_1, p_1)u_M - u_N - z_4 = 0$$

$$W(x_{1-D2}, x_2, x_{3-D2}, y_1, p_1)u_M - u_N - z_5 = 0$$

$$W(x_{1-D3}, x_2, x_{3-D2}, y_1, p_1)u_M - u_N - z_6 = 0$$

The result of the minimization provides the manipulated parameter $u_M$ value, which is typically a vector. The control allocator translates the manipulated parameter $u_M$ value to a manipulated parameter $u_M$ signal which is provided to one or more control effectors such as 214 within a controlled system, such as controlled system 110. In operation and relative to FIG. 1, control effector 114 adjusts within controlled system 110 according to the manipulated parameter $u_M$ signal, in order to attempt to generate a response within controlled system 110 that is consistent with the response commanded due to control $u_N$ signal determined by compensator 104, as a result of the error arising from r and y. Here, translating a value into a signal means translating the value into a communication suitable for receipt by the control effector, and may comprise digital-to-analog and/or digital-to-digital conversions as necessary, and may comprise any number of mathematical operations, including zero mathematical operations when the value is present in an already suitable form. Additionally and as previously discussed, in certain embodiments, the manipulated parameter $u_M$ value is a control vector $[u_m]$ with each vector component directed to one control effector in a plurality of control effectors.

Generally at 219 and as illustrated, the control allocator establishes at least an error $z_n$ for every possible combination of all $x_D$ comprising all pluralities of $x_D$ generated when the $x_D$ are substituted for specific system $x_0$ values in the control effectiveness function. For example, at FIG. 2, the errors $z_n$ established represent all possible combinations of the $x_D$ comprising the first plurality $(x_{1-D1}, x_{1-D2}, x_{1-D3})$ for $x_1$ and the second plurality $(x_{3-D1}, x_{3-D2})$ for $x_3$, when $x_D$ values are substituted for corresponding specific system $x_0$ values in the control effectiveness function.

In a particular embodiment, each $x_D$ satisfies the relationship with an $x_{PDF}$ as stated and further each $x_{PDF}$ is a sigma point of the probability density function $(\mu, \sigma^2)$. As is understood, sigma points (and their associated weights) describe a collection of points and weights in a distribution where, if treated as elements of a discrete probability distribution, weighted sums of the sigma points can be constructed to reflect a mean and variance equal to the given mean and variance of the probability density function $(\mu, \sigma^2)$. An associated weighted sum of the errors $z_n$, or a function of the errors $z_n$, where $z_n$ is an error associated with a sigma point can alternatively be minimized at 219. See e.g., Julier et al., "A new approach for filtering nonlinear systems," *Proceedings of the American Control Conference* 3 (1995); see also Julier et al., "Unscented Filtering and Nonlinear Estimation," *Proceedings of the IEEE* 92(3) (2004); see also Julier et al, "The Spherical Simplex Unscented Transformation," *Proceedings of the American Control Conference* (2003), among others. For example, at FIG. 3, the plurality of distributed $x_D$ illustrated as $x_{D1}$, $x_{D2}$, and $x_{D3}$ satisfy $0.8 \leq x_D/x_{PDF} \leq 1.2$ for specific $x_{PDF}$ points corresponding to sigma points $(\mu-\sigma)$, $\mu$, and $(\mu+\sigma)$ respectively. In another embodiment, each $x_{PDF}$ further satisfies a relation $0.8 \leq x_{PDF}/S \leq 1.2$, or in some embodiments $0.9 \leq x_{PDF}/S \leq 1.1$, where S is a sigma point of the probability density function $(\mu, \sigma^2)$. Additionally, in some embodiments, an absolute value of the specific system state $x_0$ value minus $x_{PDF}$ is less than 3 times the standard deviation $\sigma$ of the probability density function $(\mu, \sigma^2)$, such that $|x_0 - x_{PDF}| \leq 3\sigma$, where $x_0$ is the specific system state $x_0$ value.

In certain embodiments, comparison element 101 comprises a reference input terminal 102, a system input terminal 103, and is configured to provide an error e value dependent on an input r signal at reference input terminal 102 such as r and a controlled system output $y_j$ signal at system input terminal 103 such as y. In an embodiment, comparison element 101 is a summing element configured to provide an error e value proportional to (r−y). However, comparison element 101 may be any analog or digital device or combination of devices configured to receives a first input and a second input and provide an output based on the first input and the second input, such as a differential amplifier. Typically in practice, reference input terminal 102 receives a signal indicating a desired overall state of controlled system 110 and system input terminal 103 receives a signal indicating a current state of controlled system 110 and arising from one or more sensors within controlled system 110, such as sensor 115. For example, controlled system 110 might be a satellite designed to establish specific commanded orientations, and reference input terminal 102 might receive a desired orientation while the system input terminal 103 might receive an actual orientation reported from the satellite. Additionally and as is understood, a reference input r may be provided as single value r or as a vector $[r_i]$ expressing multiple values, and similarly a system output $y_j$ signal may be provided as single value y or as a vector $[y_i]$ expressing multiple values.

As discussed, compensator 104 is in data communication with comparison element 101 and is configured such that an input received such as e generates the control $u_N$ value at FIG. 1, where $u_N$ is dependent on e. Here, when the control $u_N$ value is dependent on the error e value, this means that compensator 104 provides the control $u_N$ value based on a controlling equation G(e), where one or more terms of the equation G(e) comprise the error e value. For example, compensator 104 might be a proportional-integral-derivative controller (PID controller), and $u_N$ might be a torque vector generated from the controlling equation as a result of an error e value arising from a difference between a satellite's desired and actual orientations. The control $u_N$ value generated is some value which can ultimately be related to controlled system 110 via the control effectiveness function $u_N = W(x_i, y_j, p_k)u_M$. For example, $u_N$ might be a torque vector generated as a result of an error e value arising from a difference between a satellite's desired and actual orientations, the system state $x_i$ values might comprise a series of gimbal angles reported from the satellite, the system output $y_j$ values might be a vector describing a current orientation of the satellite, and $u_M$ might be a vector of gimbal rate commands necessary to generate the torque vector $u_N$ from the present orientation of the satellite and intended to mitigate the error e value.

Compensator 104 is in data communication with control allocator 105 and configured to communicate at least the control $u_N$ value to control allocator 105. Control allocator 105 comprises one or more system state input terminals such as 106, 107, and 108 for receipt of system state $x_i$ signals, and additionally comprises a control allocator output terminal 109. Control allocator may also comprise one or more control effectiveness parameter input terminals such as 140. Control allocator 105 is typically a computing device such as a digital processor programmed to perform steps whereby a manipulated parameter $u_M$ value is determined based on a probability distribution $(\mu, \sigma^2)$ defined around at least one value representing a system state $x_i$ signal, a system output $y_j$ signal, and/or a control effectiveness parameter $p_k$ signal. Control allocator 105 is additionally configured to receive one or more system state $x_i$ signals at the system state input terminals and translate the system state $x_i$ signals to system state $x_i$ values suitable for the evaluation, and to translate system output $y_j$ signals and control effectiveness parameter $p_k$ signals into values for evaluation as necessary. Here, translating a signal into a value means translating the signal into a digital expression suitable for treatment as a value in a series of computations. Such translation may comprise analog-to-digital conversions and/or digital-to-digital conversions as necessary, and may comprise any number of mathematical operations, including zero mathematical operations when the signal arrives at a terminal and is present in an already suitable form.

In an embodiment, the control effectiveness function is of the form $u_N = W(x_i, y_j, p_k) u_M$, where as discussed $W(x_i, y_j, p_k)$ is one or more terms comprising variables representing one or more of the system state $x_i$ values, the system output $y_j$ values, and the control effectiveness parameters $p_k$ values, $u_M$ is typically a vector expressing manipulated variable $u_M$ values to be applied to controlled system 110, and W serves to map $u_N$ to $u_M$. The control $u_N$ value may be evaluated and the system state $x_i$ signals, system output $y_j$ signals, and control effectiveness parameters $p_k$ signals may be received in a substantially continuous fashion based on the sampling frequency of a feedback network, or may be employed only within a neighborhood around specific system state $x_i$, system output $y_j$, and control effectiveness parameters $p_k$ values. Additionally, in a particular embodiment, the error function $E(z_i)$ is selected such that an absolute value of the error function $E(z_i)$ decreases as a summation of the individual errors comprising the error function decreases. In selected embodiments, the error function $E(z_i)$ is a sum of residual squares, an $L_1$ norm, or an infinity norm.

Additionally, as can be appreciated by those of skill in the art, the various operations and components shown in FIG. 1 are shown separately for clarity of description but in various embodiments can run partially in parallel, and/or be combined into components that perform more than one operation. For example, compensator 104 and control allocator 105 could be combined into a compensator/control allocator, other components could be combined similarly. Further as can be appreciated by those of skill in the art, the various operations and components shown in FIG. 1 can be implemented is software, hardware or both.

In a selected embodiment, closed-loop controller 100 further comprises at least a first sensor in data communication with the system input terminal 103 of comparison element 101 and at least a second sensor in data communication with the one or more system state terminals of control allocator 105, and further comprises at least one control effector in data communication with the control allocator output terminal 109. Here, sensor means a physical device including a digital device which detects, measures, or estimates one or more physical properties present within the controlled system and generates a signal based on some magnitude of the physical property. The sensor may afford direct measurements of properties such as temperature, pressure, accelerations, and the like, or may be a control system estimator generating a signal based on physical properties measured within the controlled system. Similarly, control effector means a physical device within the controlled system where operation of the control effector generates a change in the behavior of the controlled system sufficient to alter a value of the one or more of the system output $y_j$ signals.

Description of an Embodiment:

As discussed previously, a fundamental challenge with CMG systems is that gimbal lock can occur in the CMG momentum space, and consequently such systems are operated in a manner where the usable momentum for typical control concepts is much less than the total available momentum. Increasing the maximum slew rate by simply using more of the total available momentum is difficult, since the CMG steering must ensure that gimbal lock can be properly avoided. The usual way gimbal lock is avoided is simply to operate the CMG system conservatively—by restricting the maximum vehicle rate to a range where gimbal lock cannot occur.

Figure 4:
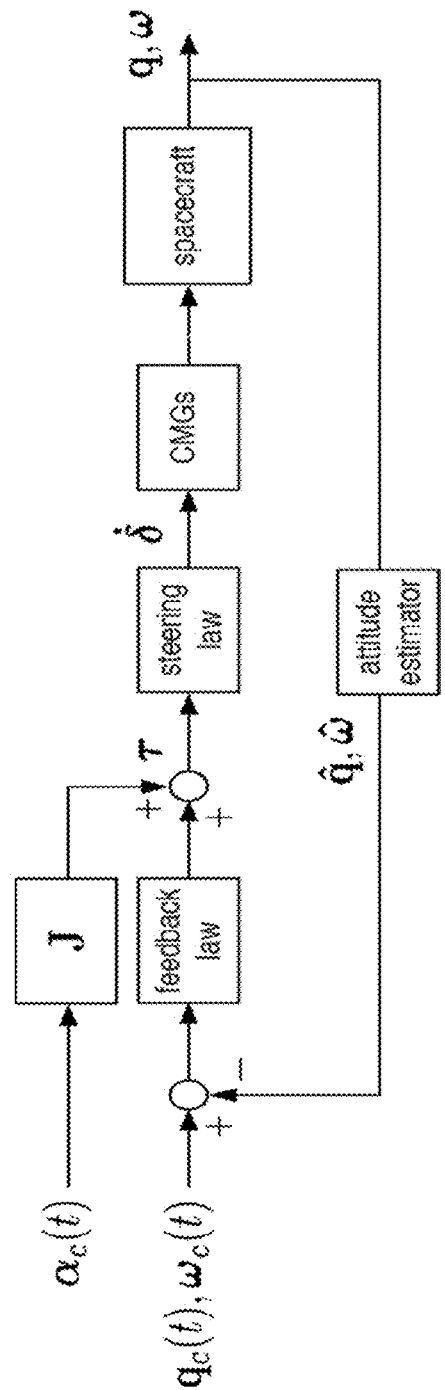
FIG. 4 illustrates a typical CMG control system.

As discussed, many imaging satellites utilize control moment gyro (CMG)-based attitude control systems in order to enable large slew rates and enhance agility. The block diagram of a typical attitude control system for a CMG imaging satellite is shown at FIG. 4. Design of the steering law block is critical because if done improperly the CMGs can enter gimbal lock, a condition in which active control of the spacecraft is lost. The status quo solution has been to operate CMGs over only a limited range of their full operational envelope to operate only in areas where gimbal-lock cannot physically occur, leading to generally over-sized systems.

Figure 5:
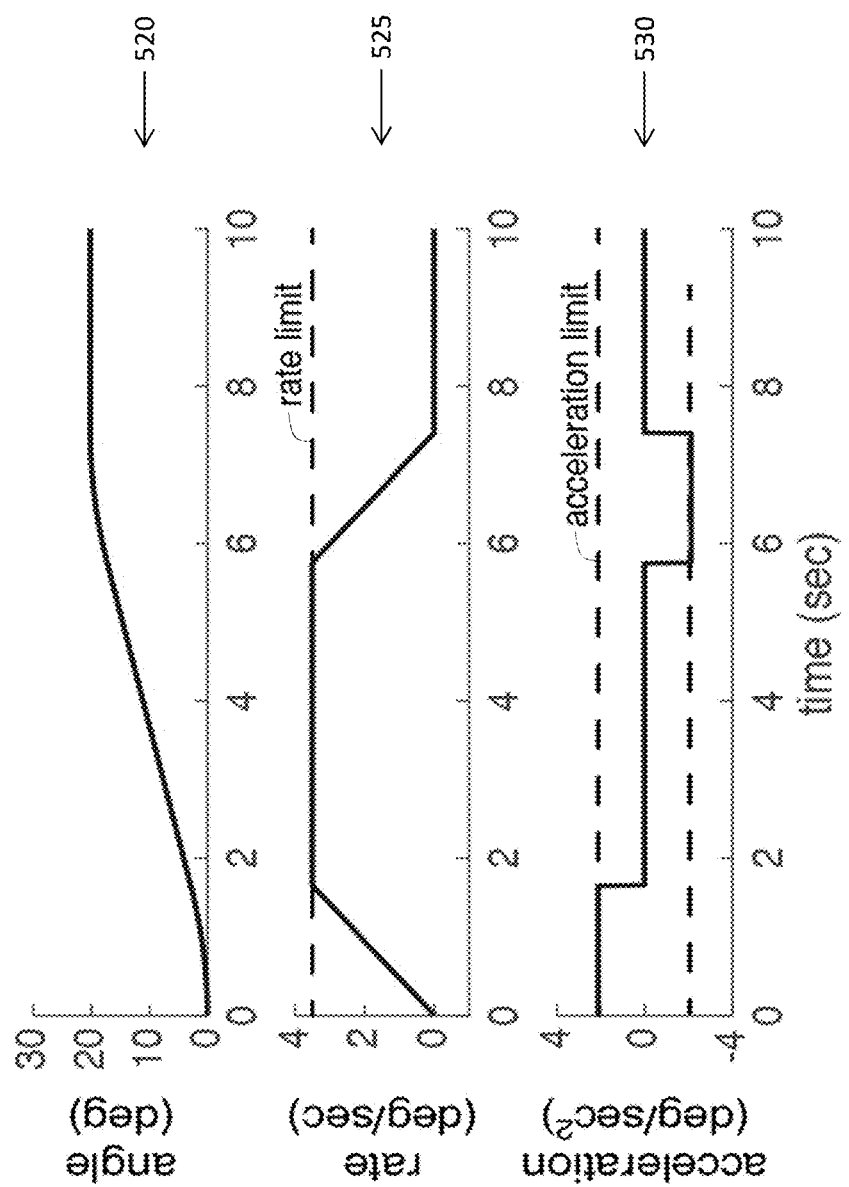
FIG. 5 illustrates an exemplary bang-off-bang maneuver.

As an example, suppose it is necessary to rotate a spacecraft through a given angle about an eigenaxis in order to acquire a location for imaging. A typical attitude maneuver (slew) profile, known as a bang-off-bang maneuver is shown in FIG. 5, with angle, rate, and acceleration indicated generally at 520, 525, and 530 respectively, along with associated rate limit and acceleration limit The bang-off-bang profile takes its name from the maneuver acceleration profile (530) which first demands the maximum acceleration (bang) in order to increase the vehicle rotational rate as quickly as possible. This maximum slew acceleration is typically defined by a maximum torque output of a momentum control system (MCS).

Once the vehicle reaches the maximum slew rate limit, the acceleration is reduced to zero (off) and the vehicle coasts for a pre-defined period of time. This maximum slew rate limit is typically defined by the range of momentum output of an MCS that, as discussed previously, is normally limited to less than the full capacity or capability of the system. During the final stage of the maneuver, the maximum acceleration is reversed (bang) in order to bring the vehicle into alignment with the desired target (see 520). In some cases the bang-off-bang maneuver is "softened" by introducing limits on the jerk and/or higher-order derivatives of the acceleration, but in these cases the MCS torque and momentum output still ultimately dictate the slew capability of the vehicle. Thus, the time needed to reorient the satellite to a new target depends on two parameters: (i) the maximum slew acceleration defined by torque and (ii) the maximum slew rate defined by momentum. The fundamental challenge with CMG systems is that gimbal lock can occur in the CMG momentum space and this places an artificial limit on the maximum slew rate, since the typical approach for CMG steering must restrict the maximum vehicle rate to a range where gimbal lock cannot occur, regardless of system sizing.

As an illustrative example of how gimbal lock phenomenon can occurs in practice, consider the equation that relates the requested CMG output torque to the CMG gimbal rate commands $$\tau = A(\delta)\dot{\delta} \quad (1)$$

where $\tau$ is the requested CMG torque vector, $\dot{\delta}$ is the vector of CMG gimbal rate commands, and $A(\delta)$ is the so-called CMG Jacobian matrix that relates the change in the CMG output torque to changes in the CMG gimbal rates, $\dot{\delta}$. As per this description, the function $A(\delta)$ represents a control effectiveness matrix for a CMG system.

Since the variables necessary for commanding the CMGs are the gimbal rates, (1) may be inverted to solve the gimbal rates in terms of the requested torque $$\dot{\delta} = A^+(\delta)\tau \quad (2)$$

where $A^+(\delta)$ denotes a special inverse called a Moore-Penrose pseudoinverse that must be used because the matrix $A(\delta)$ is a non-square n×m matrix where m>n due to the use of m redundant CMG units. The Moore-Penrose pseudoinverse is computed straightfowardly as $$A^+(\delta) = A^T(AA^T)^{-1} \quad (3)$$

Consider now the Jacobian matrix for a standard CMG pyramid $$A(\delta) = \quad (4)$$
$$\begin{bmatrix} -\cos(\beta)\cos(\delta_1) & \sin(\delta_2) & \cos(\beta)\cos(\delta_3) & -\sin(\delta_4) \\ -\sin(\delta_1) & -\cos(\beta)\cos(\delta_2) & \sin(\delta_3) & \cos(\beta)\cos(\delta_4) \\ \sin(\beta)\cos(\delta_1) & \sin(\beta)\cos(\delta_2) & \sin(\beta)\cos(\delta_3) & \sin(\beta)\cos(\delta_4) \end{bmatrix}$$

where parameter $\beta$ is the CMG skew angle.

Referring to (4), for certain angles of the CMGs, it is apparent that the Jacobian matrix may lose rank. For example, consider the case where $\beta$=53.13-deg (a typical CMG skew angle) and $\delta = [\pi/2, 0, -\pi/2, 0]^T$. For this configuration, $$A(\delta) = \begin{bmatrix} 0 & 0 & 0 & 0 \\ -1 & -0.6 & -1 & 0.6 \\ 0 & 0.8 & 0 & 0.8 \end{bmatrix} \quad (5)$$

which clearly has rank 2 due to the zero row. However, in order to invert (5) via the Moore-Penrose pseudoinverse the rank must be 3. Hence, it is not possible to compute a control vector $\dot{\delta}$ for the satellite and the spacecraft becomes uncontrollable.

To overcome this issue, a "singularity robust" pseudoinverse has been proposed previously where the matrix inversion is carried out by slightly modifying the Moore-Penrose pseudoinverse as $$A^{\#}(\delta) = A^T(AA^T + \lambda I)^{-1} \quad (6)$$

where I is the identity matrix and $\lambda$ is a small constant. The addition of the term $\lambda I$ "regularizes" the matrix so that full rank can be maintained and the matrix inverted.

Referring back to Jacobian matrix given in (5), the singularity robust pseudoinverse can indeed be computed as $$A^{\#} = \begin{bmatrix} 0 & -0.3663 & 0 \\ 0 & -0.2198 & 0.6202 \\ 0 & -0.3663 & 0 \\ 0 & 0.2198 & 0.6202 \end{bmatrix} \quad (7)$$

Even though it is now possible to compute the pseudoinverse, the problem of controlling the spacecraft remains. Suppose the requested torque vector is $\tau = [1,0,0]^T$ for a rotation about the spacecraft x-body axis. Using (7), computed gimbal rate commands are $$\dot{\delta} = A^{\#}\tau = \begin{bmatrix} 0 & -0.3663 & 0 \\ 0 & -0.2198 & 0.6202 \\ 0 & -0.3663 & 0 \\ 0 & 0.2198 & 0.6202 \end{bmatrix} \begin{bmatrix} 1 \\ 0 \\ 0 \end{bmatrix} = \begin{bmatrix} 0 \\ 0 \\ 0 \\ 0 \end{bmatrix} \quad (8)$$

From (8), it is evident that the CMGs will not be rotated to achieve the desired torque because the vector of gimbal rate commands is null. Thus, even though (6) allows an inverse mapping from a requested torque vector to a gimbal rate command vector to be found, the spacecraft still cannot be controlled. This is an example of how the CMG array can become locked into a so-called singular state. Since "singularity robust" pseudoinverses do not fully mitigate the control allocation problem, the typical solution is to avoid all of this complexity by keeping the CMGs operating in a singularity free region. This is done simply, by restricting the CMG gimbal angles. This reduces the size of the CMG operational envelope and degrades agility.

Figure 6:
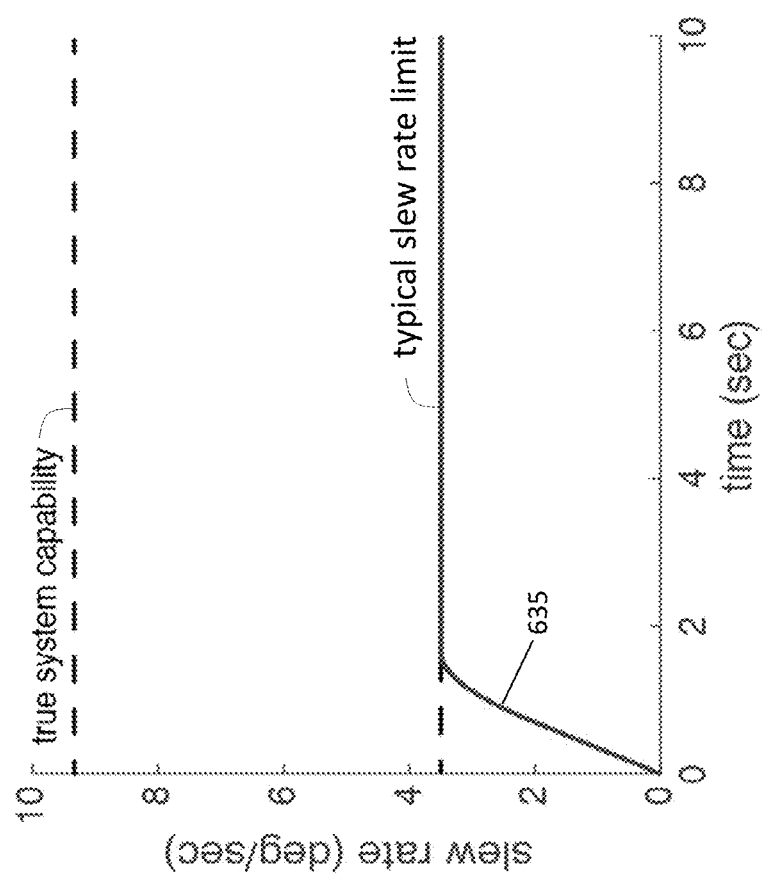
FIG. 6 illustrates performance using a typical CMG control system.

To illustrate the performance that can be left on the table using a typical approach, a simple simulation was performed to determine the maximum slew rate that can be achieved about the x-body axis for a generic satellite model when using singularity robust CMG steering. The results are shown in FIG. 6 as 635 along with the associated typical slew rate limit. Also shown is the actual slew rate (true system capability) that can be achieved per the physics of the system. The true capability of the system allows a slew rate of about 9.3 deg/sec. As is seen, however, even when using a singularity robust steering (the status quo) it is only possible to achieve a slew rate of 3.5 deg/sec. Thus, typical concepts severely restrict the performance of the CMG system.

In the embodiment discussed here, in order to utilize the full capability of the CMG system for slew, the disclosure provides a new control allocation scheme for CMGs based on a statistical representation of the CMG Jacobian matrix so that higher slew rates can be realized for a given size, weight, and power (SWaP). The key insight is that the rank degeneracy of the CMG Jacobian matrix occurs only for specific combinations of the gimbal angles and that for slight perturbations about these degenerate cases the CMGs can indeed be properly controlled. Thus, in order to ensure controllability of the CMG system, a new stochastic/uncertain representation of the Jacobian matrix is employed which allows for maximizing controllability near singular states. The approach makes use of a well-known expression for the CMG gain margin $$S = \det(AA^T) \qquad (9)$$

The objective is to allocate commands to the CMG array in a way that maximizes the "expected" value of the CMG gain margin (viz. CMG controllability) over a small region surrounding the nominal CMG Jacobian matrix. The region chosen is a multi-dimensional Gaussian or other distribution over the nominal CMG gimbal angles. Thus, for each gimbal, j=1, 2, . . . , m, the approach chooses a stochastic perturbation of the gimbals as follows:

$$\delta_{pert,j} = \delta_{nom,j} + N(0, \sigma^2) \qquad (10)$$

where $\delta_{pert,j}$ is the artificially perturbed gimbal angle, $\delta_{nom,j}$ is the measured nominal gimbal angle, and $N(0,\sigma^2)$ refers to a Gaussian distribution with a zero-mean and variance of $\sigma^2$.

Application of (10) allows the "expected" (viz. average) CMG gain margin to be computed as $$E[S] = \int_{supp(\delta_{pert})} S(\delta_{pert}) dm(\delta_{pert}) \qquad (11)$$

where the integral in (11) is technically referred to as a "Lebesgue-Stieltjes" integral. The Lebesgue-Stieltjes integral is an integration over the probability density functions $dm(\delta_{pert})$ for all possible values of the uncertain gimbal angles—i.e. $supp(\delta_{pert})$. To ensure controllability, it is desirable to maximize the expected CMG gain margin in the vicinity of the current CMG gimbal state.

By making use of the statistics concept of the law of large numbers, which says that the average of the results obtained form a large number of samples should be close to the expected value (and will tend to become closer as the number of samples is increased), the Lebesgue-Stieltjes integrals may be avoided with $$E[S] \approx \frac{1}{N} \sum_{i=1}^{N} S(\delta_{pert,i}) \qquad (12)$$

The sum in (12) can be determined by Monte Carlo sampling over a "sufficiently large" number, i=1, 2, . . . , N, of gimbal angle samples or by using sigma points as previously described. Maximizing (12) can be used to resolve the CMG controllability problem. It is also necessary to ensure that the CMG output torque vector is aligned with the desired torque vector. Hence, constraints of the form $$A(\delta_{pert,i})\dot{\delta} - \tau = z_i \text{ for } i=1,2,\ldots,N \qquad (13)$$

are included, where $z_i$ is the residual torque error for sample i. To ensure the torque error is sufficiently small, additionally write $$\sum_{i=1}^{N} \frac{1}{2} z_i^T z_i \leq \epsilon \qquad (14)$$

Equation (14) ensures that the residual error over all the samples is within $\epsilon$, where $\epsilon$ is the desired torque accuracy.

Equations (12), (13) and (14) may be combined into a simple optimization problem over the control vector $\dot{\delta}$:

$$\text{maximize} \quad \frac{1}{N} \sum_{i=1}^{N} S(\delta_{pert,i}) \qquad (15)$$

$$\text{subject to} \quad \begin{aligned} A(\delta_{pert,1})\dot{\delta} - \tau &= z_1 \\ A(\delta_{pert,2})\dot{\delta} - \tau &= z_2 \\ &\vdots \\ A(\delta_{pert,N})\dot{\delta} - \tau &= z_N \end{aligned}$$

$$\sum_{i=1}^{N} \frac{1}{2} z_i^T z_i \leq \epsilon$$

A similar problem, where it is desired instead to minimize the sum-of-squares torque error without regard to the CMG gain margin, might be expressed as:

$$\text{minimize} \quad \sum_{i=1}^{N} \frac{1}{2} z_i^T z_i \qquad (16)$$

$$\text{subject to} \quad \begin{aligned} A(\delta_{pert,1})\dot{\delta} - \tau &= z_1 \\ A(\delta_{pert,2})\dot{\delta} - \tau &= z_2 \\ &\vdots \\ A(\delta_{pert,N})\dot{\delta} - \tau &= z_N \end{aligned}$$

An analytic solution may be derived for problem (15) or (16) to facilitate real-time implementation in flight hardware.

Figure 7:
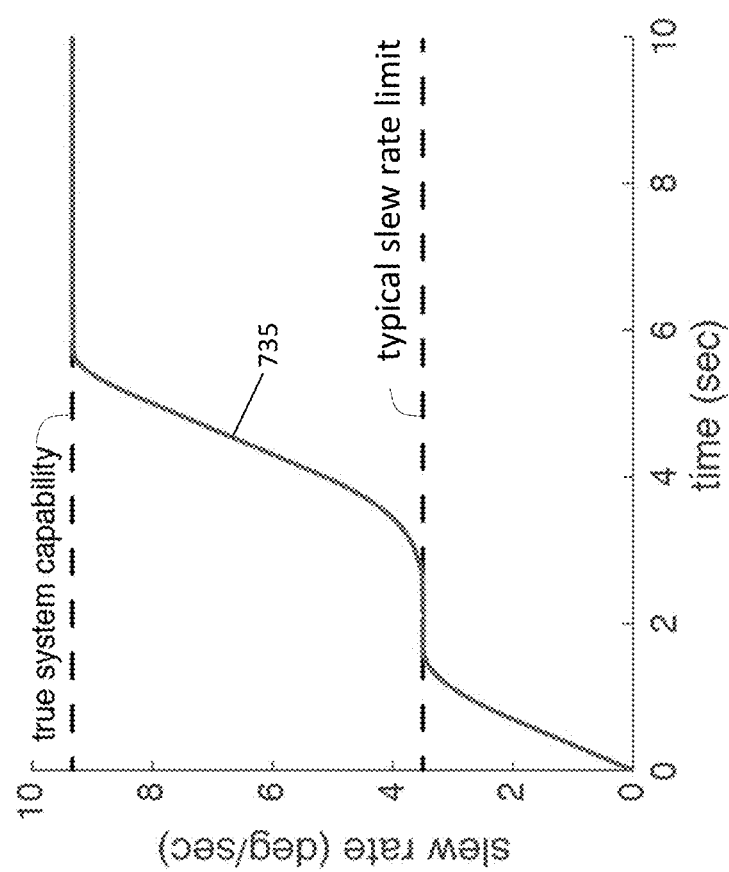
FIG. 7 illustrates improved performance using an embodiment of the disclosed control system.

To illustrate the potential performance improvement that can be obtained using the new ideas the simulation of FIG. 6 was re-done using the new disclosed concept. The results of the proposed new approach are shown in FIG. 7 as 735 (with typical slew rate limit and true system capability included for reference). Referring to FIG. 7, it is seen that the proposed approach has the potential to extend the range of operation of a CMG-based MCS so that the full system capability can be used. In this case, it was possible to increase the slew rate by >200% from 3.5 deg/sec to 9.3 deg/sec without increasing SWaP. This result is equally useful for systems where requirements are currently being met: the improvement in CMG capability resulting from the application of the new ideas means that smaller CMGs could be used to meet requirements. Hence, the new concepts also allow the SWaP to be reduced for a given level of performance.

Figure 8:
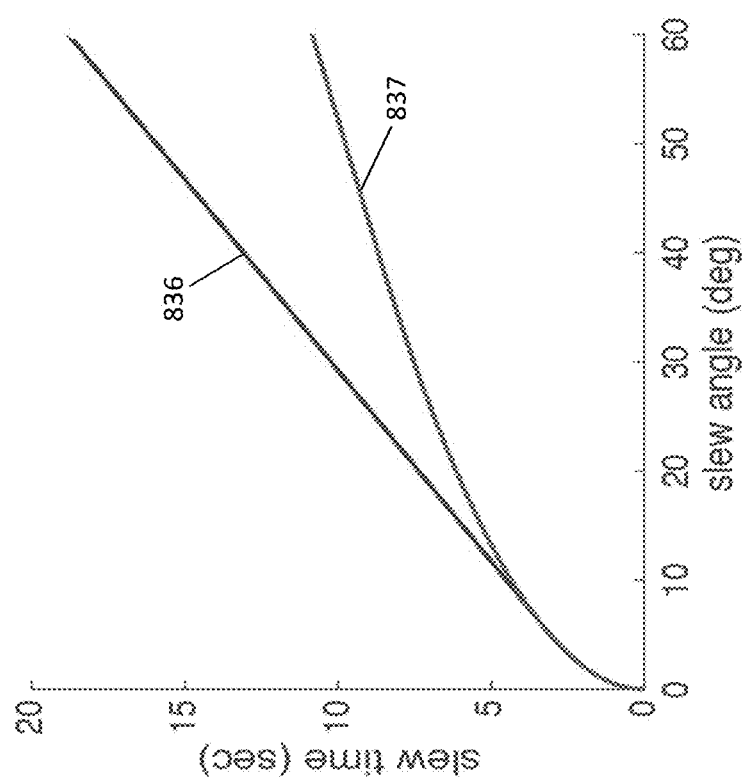
FIG. 8 further illustrates improved performance using the disclosed control system.

To further illustrate the significance of the results, consider the slew time vs. slew angle curves given in FIG. 8. Plots similar to FIG. 8 are typically used in the industry to assess the agility of a given spacecraft over standard maneuver profiles (such as the bang-off-bang maneuver of FIG. 5). FIG. 8 indicates typical performance as 836 and the performance of the disclosed concept as 837, and clearly shows that the disclosed concept significantly reduces the slew time for a given vehicle. In fact, the results show that it may be possible to reduce the slew time by more than 40% over a typical system.

The disclosure further provides a computer-implemented method of controlling a controlled system. The method comprises steps including providing a system output $y_j$ signal using a first sensor in the controlled system, providing one or more system state $x_i$ signals from at least one sensor in the controlled system, generating an error e signal using a comparison element by comparing an input r signal and the system output $y_j$ signal, and providing a control $u_N$ value dependent on the error e value. The method further comprises receiving the control $u_N$ value and system state $x_i$ signals at a control allocator programmed to evaluate a control effectiveness function which expresses the control $u_N$ value as terms comprising the system state $x_i$ values and a manipulated parameter $u_M$ value. The control allocator further identifies one or more specific system $x_0$ values and defines a plurality of distributed $x_D$ for each specific system $x_0$ value, and determines the manipulated parameter $u_M$ value by minimizing an error function comprising errors $z_i$, where each error $z_i$ comprises a difference between the control $u_N$ value and the control effectiveness function when the control effectiveness function is evaluated with the plurality of distributed $x_D$ utilized as the specific system $x_0$ value. The method further translates the manipulated parameter $u_M$ value into a manipulated parameter $u_M$ signal, communicates the manipulated parameter $u_M$ signal to a control effector in the controlled system, and operates the control effector based on the manipulated parameter $u_M$ signal.

The disclosure additionally provides a system controlling a controlled system, comprising a first sensor providing a system output $y_j$ signal, at least one other sensor providing one or more system state $x_i$ signals, and a comparison element generating an error e value through comparison of a an input r signal and the system output $y_j$ signal. The system further comprises a compensator receiving the error e value from the comparison element and providing a control $u_N$ value dependent on the error e value, and a control allocator receiving the control $u_N$ value and performing steps including evaluating a control effectiveness function expressing the control $u_N$ value based on system state $x_i$ values and a manipulated parameter $u_M$ value, selecting one or more specific system $x_0$ values, defining a plurality of distributed $x_D$ for each specific system $x_0$ value, and minimizing an error function and determining a manipulated parameter $u_M$ value. The system further acts to translate the manipulated parameter $u_M$ value into a manipulated parameter $u_M$ signal, communicate the manipulated parameter $u_M$ signal to a control effector in the controlled system, and operate the control effector based on the manipulated parameter $u_M$ signal.

Thus provided here is a closed-loop controller for a controlled system comprising a comparison element for generation of an error e value, a compensator for generation of a control $u_N$ value based on the error e value, and a control allocator for determining a manipulated parameter $u_M$ value based on the control $u_N$ value. The control allocator typically utilizes a control effectiveness function having a form such as $u_N = W(x_i, y_j, p_k)u_M$, and determines the manipulated parameter $u_M$ value through selecting one or more specific system $x_0$ signals from the system state $x_i$, system input $y_j$, and/or control effectiveness parameter $p_k$ values, defining a plurality of distributed $x_D$ around each specific system $x_0$ signal, and minimizing an error function $E(z_i)$, where the error function $E(z_i)$ is based on errors which arise from use of the plurality of distributed $x_D$ in the control effectiveness function rather than one or more specific system $x_0$ signals. The control allocator provides the manipulated parameter $u_M$ value to a control effector within the controlled system, so that the control effector may adjust within the controlled system and to generate a response in the controlled system similar to the response commanded by a control $u_N$ signal, in order to mitigate the error e value.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A closed-loop controller for a controlled system comprising:
   a comparison element comprising a reference input terminal and a system input terminal;
   a compensator in data communication with the comparison element; and
   a control allocator in data communication with the compensator, where the control allocator comprises one or more system state input terminals and a control allocator output terminal, and where the control allocator is programmed to perform steps comprising:
   receiving a control $u_N$ value from the compensator;
   receiving one or more system signals, where the one or more system signals comprise at least one of a system state $x_i$ signal, a system output $y_j$ value, and a control effectiveness parameter $p_k$ signal;
   translating each of the one or more system signals into a system value thereby generating one or more system values;
   determining a manipulated parameter $u_M$ value using a control effectiveness function, where the control effectiveness function expresses the control $u_N$ value as equal to one or more terms, where the one or more terms comprise the one or more system values, and where the one or more terms comprise the manipulated parameter $u_M$ value, by;
   selecting one or more specific system $x_0$ values, where each of the one or more specific system $x_0$ values comprises one of the one or more system values, and defining for the each of the one or more specific system $x_0$ values a plurality of distributed $x_D$ using a probability density function $(\mu, \sigma^2)$, where $\mu$ is a mean of the probability density function $(\mu, \sigma^2)$ and where $-3\sigma \leq x_0 - \mu \leq 3\sigma$ where $x_0$ is the each of the one or more specific system $x_0$ values and where $\sigma$ is a standard deviation of the probability density function $(\mu, \sigma^2)$, and where each distributed $x_D$ in the plurality of distributed $x_D$ satisfies a relationship $0.8 \leq x_D/x_{PDF} \leq 1.2$ where $x_D$ is the each distributed $x_D$ in the plurality of distributed $x_D$ and $x_{PDF}$ is a value of the probability density function $(\mu, \sigma^2)$, thereby establishing a plurality of distributed $x_D$ corresponding to the each of the one or more specific system $x_0$ values;

and minimizing an error function, where the error function comprises a plurality of errors $z_n$, where each error $z_n$ in the plurality of errors $z_n$ comprises a difference between the control $u_N$ value and the control effectiveness function when one of the $x_D$ comprising the plurality of $x_D$ corresponding to a individual specific system $x_0$ value is substituted into the control effectiveness function in place of the individual specific system $x_0$ value, thereby determining the manipulated parameter $u_M$ value;

translating the manipulated parameter $u_M$ value to a manipulated parameter $u_M$ signal; and communicating the manipulated parameter $u_M$ signal to the control allocator output terminal;

and receiving the manipulated parameter $u_M$ signal at a control effector in the controlled system and operating the control effector based on the manipulated parameter $u_M$ signal.

2. The closed-loop controller of claim 1 further comprising:
an input sensor in data communication with the system input terminal;
a system state sensor in data communication with each of the one or more system state input terminals; and
a control effector in data communication with the control allocator output terminal.

3. The closed-loop controller of claim 2 where the controller is programmed to select the specific system $x_0$ value where an absolute value of the specific system $x_0$ value minus $x_{PDF}$ is less than 3 times the standard deviation $\sigma$ of the probability density function $(\mu, \sigma^2)$, such that $|x_0 - x_{PDF}| \leq 3\sigma$.

4. The closed-loop controller of claim 3 where the control effectiveness function the controller is programmed to evaluate expresses the control $u_N$ value as $u_N = W(x_i, y_j, p_k)u_M$ where $u_N$ is the control $u_N$ value and $W(x_i, y_j, p_k)u_M$ is the one or more terms comprising the one or more system values and the manipulated parameter $u_M$ value.

5. The closed-loop controller of claim 4 where the controller is programmed to define the plurality of distributed $x_D$ such that the each distributed $x_D$ satisfies a relationship $0.8 \leq x_{PDF}/S \leq 1.2$, where S is a sigma point of the probability density function $(\mu, \sigma^2)$.

6. The closed-loop controller of claim 5 where an absolute value of the error function the controller is programmed to minimize decreases as a summation of the individual errors or a summation of a function of the individual errors comprising the error function decreases.

7. The closed-loop controller of claim 1 where the plurality of distributed $x_D$ is a vector and where probability density function $(\mu, \sigma^2)$ is a multivariate probability density function $(\mu_M, \Sigma)$, and the where the plurality of distributed $x_D$ is obtained using the multivariate probability density function $(\mu_M, \Sigma)$, where $\mu_M$ is a mean vector of the multivariate-probability density function $(\mu_M, \Sigma)$ and where $\Sigma$ is a covariance matrix of the multivariate probability density function $(\mu_M, \Sigma)$ and where $-3\sigma_i \leq x_{0,i} - \mu_i \leq +3\sigma_i$, where $x_{0,i}$ is a value along a given principal dimension of the multivariate probability distribution $(\mu_M, \Sigma)$, and where the one or more specific system $x_0$ values is the vector of one or more specific system $x_{0,i}$ values transformed from a principal axes back to one or more original coordinate axes of the multivariate-probability density function $(\mu_M, \Sigma)$.

8. The computer-implemented method of claim 1 where the plurality of distributed $x_D$ is a vector and where probability density function $(\mu, \sigma^2)$ is a multivariate probability density function $(\mu_M, \Sigma)$, and the where the plurality of distributed $x_D$ is obtained using the multivariate probability density function $(\mu_M, \Sigma)$, where $\mu_M$ is a mean vector of the multivariate-probability density function $(\mu_M, \Sigma)$ and where $\Sigma$ is a covariance matrix of the multivariate probability density function $(\mu_M, \Sigma)$ and where $-3\sigma_i \leq x_{0,i} - \mu_i \leq +3\sigma_i$ where $x_{0,i}$ is a value along a given principal dimension of the multivariate probability distribution $(\mu_M, \Sigma)$, and where the one or more specific system $x_0$ values is the vector of one or more specific system $x_{0,i}$ values transformed from a principal axes back to one or more original coordinate axes of the multivariate-probability density function $(\mu_M, \Sigma)$.

9. A computer-implemented method of controlling a controlled system comprising:
providing a system output $y_j$ signal using a first sensor in the controlled system;
providing one or more system signals, where the one or more system signals comprise at least one of a system state $x_i$ signal, a system output $y_j$ value, and a control effectiveness parameter $p_k$ signal and where the one or more system signals are provided by at least one other sensor in the controlled system;
generating an error e signal using a comparison element by:
receiving an input r signal at a first terminal of the comparison element;
receiving the system output $y_j$ signal at a second terminal of the comparison element; and
generating an error e value at an output terminal of the comparison element, where the error e value is dependent the input r signal and the output $y_j$ signal;
receiving the error e value at a compensator in data communication with the comparison element output terminal and providing a control $u_N$ value at a compensator output terminal, where the control $u_N$ value is dependent on the error e value;
receiving the control $u_N$ value at a control allocator in data communication with the compensator output terminal, where the control allocator is programmed to perform steps comprising:
receiving the one or more system signals;
translating each of the one or more system signals into a system value thereby generating one or more system values;
determining a manipulated parameter $u_M$ value using a control effectiveness function, where the control effectiveness function expresses the control $u_N$ value as equal to one or more terms, where the one or more terms comprise the one or more system values, and where the one or more terms comprise the manipulated parameter $u_M$ value, by;
selecting one or more specific system $x_0$ values, where each of the one or more specific system $x_0$ values comprises one of the one or more system values, and defining for the each of the one or more specific system $x_0$ values a plurality of distributed $x_D$ using a probability density function $(\mu, \sigma^2)$, where $\mu$ is a mean of the probability density function $(\mu, \sigma^2)$ and where $-3\sigma \leq x_0 - \mu \leq 3\sigma$ where $x_0$ is the each of the one or more specific system $x_0$ values and where $\sigma$ is a standard deviation of the probability density function $(\mu, \sigma^2)$, and where each distributed $x_D$ in the plurality of distributed $x_D$ satisfies a relationship $0.8 \leq x_D/x_{PDF} \leq 1.2$ where $x_D$ is the each distributed $x_D$ in the plurality of distributed $x_D$ and $x_{PDF}$ is a value of the probability density function $(\mu, \sigma^2)$, thereby establishing a plurality of distributed $x_D$ corresponding to the each of the one or more specific system $x_0$ values; and minimizing an error function, where the error function comprises a plurality of errors $z_n$, where each error $z_n$ in the plurality of errors $z_n$ comprises a difference between the control $u_N$ value and the control effectiveness function when one of the $x_D$ comprising the plurality of $x_D$ corresponding to a individual specific system $x_0$ value is substituted into the control effectiveness function in place of the individual specific system $x_0$ value, thereby determining the manipulated parameter $u_M$ value;

translating the manipulated parameter $u_M$ value into a manipulated parameter $u_M$ signal;

communicating the manipulated parameter $u_M$ signal to a control allocator output terminal; and receiving the manipulated parameter $u_M$ signal at a control effector in the controlled system and operating the control effector based on the manipulated parameter $u_M$ signal.

10. The computer-implemented method of claim 9 where the control effectiveness function expresses the control $u_N$ value as $u_N=W(x_i, y_j, p_k)u_M$ where $u_N$ is the control $u_N$ value and $W(x_i, y_j, p_k)u_M$ is the one or more terms comprising the one or more system values and the manipulated parameter $u_M$ value.

11. The computer-implemented method of claim 10 where an absolute value of the specific system $x_0$ value minus $x_{PDF}$ is less than 3 times the standard deviation $\sigma$ of the probability density function $(\mu,\sigma^2)$, such that $|x_0-x_{PDF}|\leq 3\sigma$, where $x_0$ is the specific system $x_0$ value.

12. The computer-implemented method of claim 11 where $0.8\leq x_{PDF}/S\leq 1.2$, where S is a sigma point of the probability density function $(\mu,\sigma^2)$.

13. The computer-implemented method of claim 12 where an absolute value of the error function decreases as a summation of the individual errors or a summation of a function of the individual errors comprising the error function decreases.

14. The computer-implemented method of claim 12 where the error function is a residual sum of squares of every error $z_i$ in the plurality of errors $z_i$.

15. A system controlling a controlled system comprising:
a first sensor in the controlled system providing a system output $y_j$ signal;
at least one other sensor in the controlled system providing one or more system signals, where the one or more system signals comprise at least one of a system state $x_i$ signal, a system output $y_j$ value, and a control effectiveness parameter $p_k$ signal;
a comparison element generating an error e value by:
receiving an input r signal;
receiving the system output $y_j$ signal from the first sensor; and
generating an error e value, where the error e value is dependent the input r signal and the output $y_j$ signal;
a compensator receiving the error e value from the comparison element and providing a control $u_N$ value, where the control $u_N$ value is dependent on the error e value;
a control allocator receiving the control $u_N$ value from the compensator and the control allocator performing steps comprising:
receiving the one or more system signals from the at least one other sensor;

translating each of the one or more system signals into a system value, thereby generating one or more system values;

determining a manipulated parameter $u_M$ value using a control effectiveness function, where the control effectiveness function expresses the control $u_N$ value as equal to one or more terms, where the one or more terms comprise the one or more system values, and where the one or more terms comprise the manipulated parameter $u_M$ value, by;

selecting one or more specific system $x_0$ values, where each of the one or more specific system $x_0$ values comprises one of the one or more system state values, and defining for the each of the one or more specific system $x_0$ values a plurality of distributed $x_D$ using a probability density function $(\mu,\sigma^2)$, where $\mu$ is a mean of the probability density function $(\mu,\sigma^2)$ and where $-3\sigma\leq x_0-\mu\leq 3\sigma$ where $x_0$ is the each of the one or more specific system $x_0$ values and where $\sigma$ is a standard deviation of the probability density function $(\mu,\sigma^2)$, and where each distributed $x_D$ in the plurality of distributed $x_D$ satisfies a relationship $0.8\leq x_D/x_{PDF}\leq 1.2$ where $x_D$ is the each distributed $x_D$ in the plurality of distributed $x_D$ and $x_{PDF}$ is a value of the probability density function $(\mu,\sigma^2)$, thereby establishing a plurality of distributed $x_D$ corresponding to the each of the one or more specific system $x_0$ values; and minimizing an error function, where the error function comprises a plurality of errors $z_n$, where each error $z_n$ in the plurality of errors $z_n$ comprises a difference between the control $u_N$ value and the control effectiveness function when one of the $x_D$ comprising the plurality of $x_D$ corresponding to a individual specific system $x_0$ value is substituted into the control effectiveness function in place of the individual specific system $x_0$ value, thereby determining the manipulated parameter $u_M$ value;

translating the manipulated parameter $u_M$ value into a manipulated parameter $u_M$ signal; and communicating the manipulated parameter $u_M$ signal to a control allocator output terminal; and a control effector in the controlled system receiving the manipulated parameter $u_M$ signal from the control allocator output terminal and the control effector operating based on the manipulated parameter $u_M$ signal.

16. The system of claim 15 further comprising the controller selecting the specific system $x_0$ value where an absolute value of the specific system $x_0$ value minus $x_{PDF}$ is less than 3 times the standard deviation $\sigma$ of the probability density function $(\mu,\sigma^2)$, such that $|x_0-x_{PDF}|\leq 3\sigma$.

17. The system of claim 15 further comprising the controller evaluating the control effectiveness function where the control effectiveness function expresses the control $u_N$ value as $u_N=W(x_i, y_j, p_k)u_M$ where $u_N$ is the control $u_N$ value and $W(x_i, y_j, p_k)u_M$ is the one or more terms comprising the one or more system state values and the manipulated parameter $u_M$ value.

18. The system of claim 17 further comprising the controller defining the plurality of distributed $x_D$ such that the each distributed $x_D$ satisfies a relationship $0.8\leq x_{PDF}/S\leq 1.2$, where S is a sigma point of the probability density function $(\mu,\sigma^2)$.

19. The system of claim 18 further comprising the controller minimizing the error function where an absolute value of the error function decreases as a summation of the individual errors comprising the error function decreases.

20. The system of claim 19 where the plurality of distributed $x_D$ is a vector and where probability density function $(\mu,\sigma^2)$ is a multivariate probability density function $(\mu_M, \Sigma)$, and the where the plurality of distributed $x_D$ is obtained using the multivariate probability density function $(\mu_M, \Sigma)$, where $\mu_M$ is a mean vector of the multivariate-probability density function $(\mu_M, \Sigma)$ and where $\Sigma$ is a covariance matrix of the multivariate probability density function $(\mu_M, \Sigma)$ and where $-3\sigma_i \leq x_{0,i} - \mu_i \leq +3\sigma_i$ where $x_{0,i}$ is a value along a given principal dimension of the multivariate probability distribution $(\mu_M, \Sigma)$, and where the one or more specific system $x_0$ values is the vector of one or more specific system $x_{0,i}$ values transformed from a principal axes back to one or more original coordinate axes of the multivariate-probability density function $(\mu_M, \Sigma)$.

\* \* \* \* \*